United States Patent
Jones et al.

(10) Patent No.: US 9,131,059 B2
(45) Date of Patent: Sep. 8, 2015

(54) SYSTEMS, METHODS, AND COMPUTER PROGRAMS FOR JOINING AN ONLINE CONFERENCE ALREADY IN PROGRESS

(75) Inventors: Boland T. Jones, Atlanta, GA (US); David Michael Guthrie, Atlanta, GA (US); Peter Stewart, Berkeley Lake, GA (US); Tammy Hammond, Atlanta, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 0 days.

(21) Appl. No.: 13/822,830

(22) PCT Filed: Oct. 28, 2011

(86) PCT No.: PCT/US2011/058446
§ 371 (c)(1),
(2), (4) Date: Apr. 21, 2014

(87) PCT Pub. No.: WO2012/148454
PCT Pub. Date: Nov. 1, 2012

(65) Prior Publication Data
US 2014/0232817 A1 Aug. 21, 2014

Related U.S. Application Data

(63) Continuation-in-part of application No. PCT/US2010/033137, filed on Apr. 30, 2010, and a continuation-in-part of application No. 12/790,193, filed on May 28, 2010.

(51) Int. Cl.
*H04M 3/56* (2006.01)
*H04N 7/15* (2006.01)

(52) U.S. Cl.
CPC .............. *H04M 3/568* (2013.01); *H04M 3/563* (2013.01); *H04N 7/155* (2013.01)

(58) Field of Classification Search
USPC ............. 379/202.01, 201.03, 203.01, 204.01; 348/14.09; 386/131; 370/356; 455/416
See application file for complete search history.

(56) References Cited

U.S. PATENT DOCUMENTS

| | | | | |
|---|---|---|---|---|
| 8,373,743 | B2 * | 2/2013 | Hearn | 348/14.08 |
| 8,744,054 | B2 * | 6/2014 | Dufrene et al. | 379/201.01 |
| 2002/0126626 | A1 * | 9/2002 | Singh et al. | 370/260 |
| 2003/0058884 | A1 * | 3/2003 | Kallner et al. | 370/465 |
| 2004/0024819 | A1 * | 2/2004 | Sasaki et al. | 709/205 |

(Continued)

*Primary Examiner* — Joseph J Nguyen
(74) *Attorney, Agent, or Firm* — Smith Risley Tempel Santos LLC

(57) ABSTRACT

Various embodiments of systems, methods, and computer programs are disclosed for joining an online conference already in progress. One such method comprises: a conferencing system establishing an audio conference between a plurality of participants accessing the conferencing system via a communication network; the conferencing system presenting to the participants via a graphical user interface the audio conference and a conference interface displaying a participant object identifying each of the participants; synchronously recording the audio conference with content presented in the conference interface; storing the synchronized audio conference and the content; during the audio conference, receiving from a new participant a request to join the audio conference already in progress; and in response to the request to join the audio conference, playing back the synchronized audio conference and the content presented in the conference interface to the new participant beginning from a recording start location.

14 Claims, 21 Drawing Sheets

(56) References Cited

U.S. PATENT DOCUMENTS

| | | | |
|---|---|---|---|
| 2004/0207724 A1* | 10/2004 | Crouch et al. | 348/14.09 |
| 2005/0233736 A1* | 10/2005 | Berstis et al. | 455/416 |
| 2007/0263603 A1* | 11/2007 | Schmitt | 370/356 |
| 2008/0008458 A1* | 1/2008 | Gudipaty et al. | 386/131 |
| 2010/0158232 A1* | 6/2010 | Sylvain | 379/202.01 |

* cited by examiner

SYSTEMS, METHODS, AND COMPUTER PROGRAMS FOR JOINING AN ONLINE CONFERENCE ALREADY IN PROGRESS

CROSS-REFERENCE TO RELATED APPLICATIONS

This application is a continuation-in-part patent application of International Patent Application Serial No. PCT/US2010/033137, entitled "Record and Playback in a Conference" and filed Apr. 30, 2010, which international patent application designates the United States and is hereby incorporated by reference in its entirety.

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other multimedia, text, graphics, etc. These types of convenient conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

Various embodiments of systems, methods, and computer programs are disclosed for joining an online conference already in progress. One such method comprises: a conferencing system establishing an audio conference between a plurality of participants accessing the conferencing system via a communication network; the conferencing system presenting to the participants via a graphical user interface the audio conference and a conference interface displaying a participant object identifying each of the participants; synchronously recording the audio conference with content presented in the conference interface; storing the synchronized audio conference and the content; during the audio conference, receiving from a new participant a request to join the audio conference already in progress; and in response to the request to join the audio conference, playing back the synchronized audio conference and the content presented in the conference interface to the new participant beginning from a recording start location.

DETAILED DESCRIPTION

Figure 1:
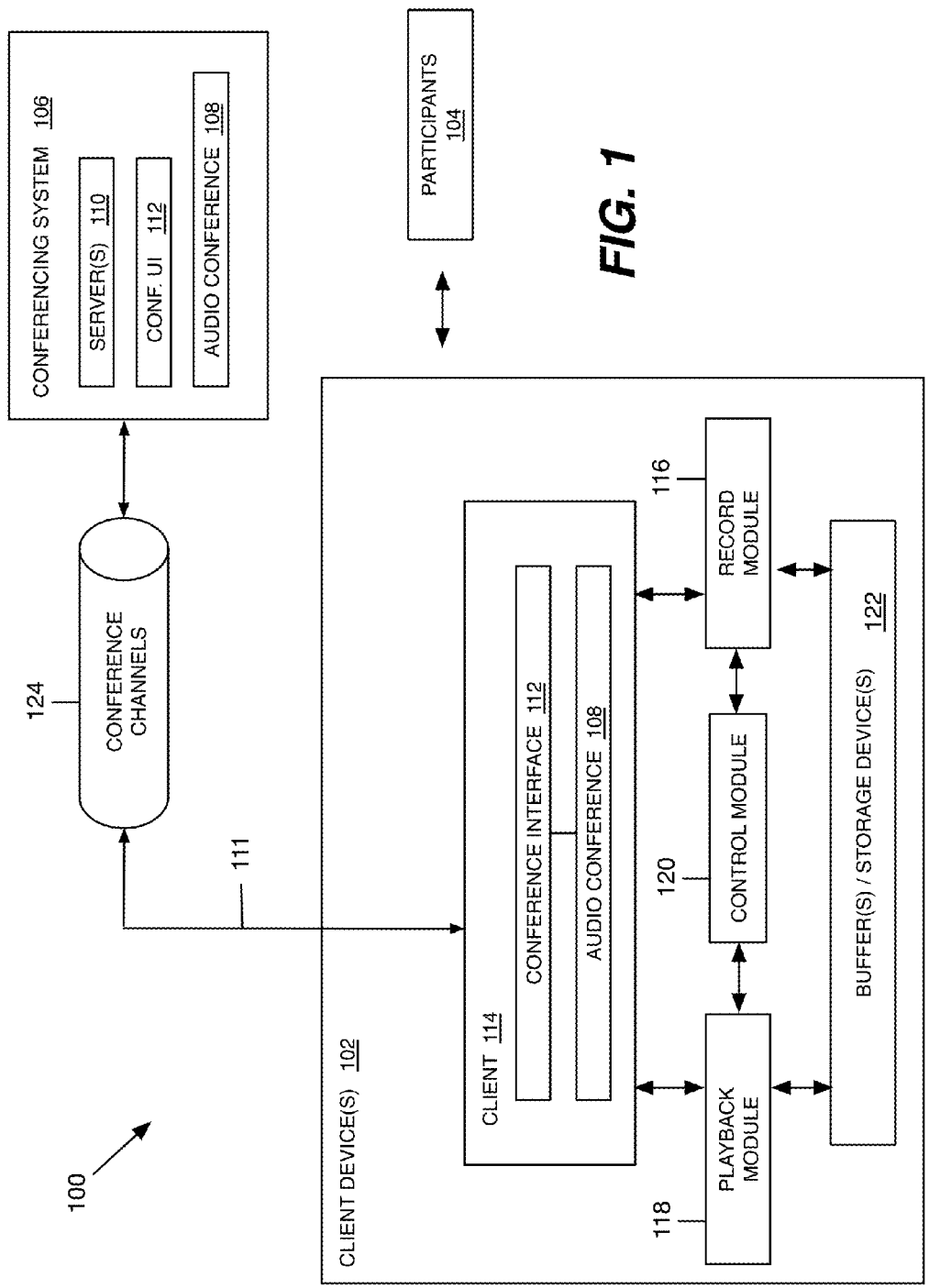
FIG. 1 is a block diagram illustrating an embodiment of a conference record/playback system.

Various embodiments of systems, methods, and computer programs are disclosed for enabling a participant to join an online conference already in progress via a computer system, such as, the conference record/playback system described in the above-referenced international patent application. It should be appreciated that the online conference may provide a visually engaging conference experience to participants of a conference via a conference user interface presented to a client device. The conference interface may be used for conferences, meetings, groupings or other types gatherings (collectively, a "conference" with a system that provides the conference interface for a conference being referred to herein as a "conferencing system") for any variety of purposes of one or more people, groups or organizations (including combinations thereof and collectively referred to as "participants") with or without an audio component, including, without limitation, enabling simulcast audio with such conference for the participants. As described below in detail with reference to one or more of the embodiments illustrated in the drawings (as well as the above-referenced international patent application), the conference interface may be configured to provide any desirable content and/or functionality and may support various user interface and/or conferencing features, including conference record/playback features, an "always on" record mode, and various methods for enabling a participant to join a conference already in progress.

FIG. 1 illustrates an embodiment of a conference record/playback system 100 for enabling participants 104 to selectively record, playback and distribute various components of a conference provided by a conferencing system 106. The conference record/playback system 100 comprises a conferencing system 106 and a plurality of client devices 102 connected via one or more communication networks 111. The network(s) 111 may support wired and/or wireless communication via any suitable protocols, including, for example, the Internet, the Public Switched Telephone Network (PSTN), cellular or mobile network(s), local area network(s), wide area network(s), or any other suitable communication infrastructure. The client devices 102 may be associated with corresponding participants 104 of an audio conference 108. A participant may comprise a "host" or "participant" and such terms merely refer to different user roles or permissions associated with the audio conference 108. For example, the "host" may be the originator of the audio conference 108 and, consequently, may have user privileges that are not offered to the participants, and the conference interface 112 may provide additional functionality not available to the other participants. Nonetheless, it should be appreciated that the terms "host," "participant," and "user" may be used interchangeably depending on the context in which it is being used.

The client devices 102 may comprise any desirable computing device, which is configured to communicate with the conferencing system 106 and the server(s) 110 via the networks 111. The client device 102 may comprise, for example, a personal computer, a desktop computer, a laptop computer, a mobile computing device, a portable computing device, a smart phone, a cellular telephone, a landline telephone, a soft phone, a web-enabled electronic book reader, a tablet computer, or any other computing device capable of communicating with the conferencing system 106 and/or the server(s) 110 via one or more networks 111. The client device 102 may include client software (e.g., a browser, plug-in, or other functionality) configured to facilitate communication with the conferencing system 106 and the server 110. It should be appreciated that the hardware, software, and any other performance specifications of the client device 102 are not critical and may be configured according to the particular context in which the client device 102 is to be used.

Figure 2:
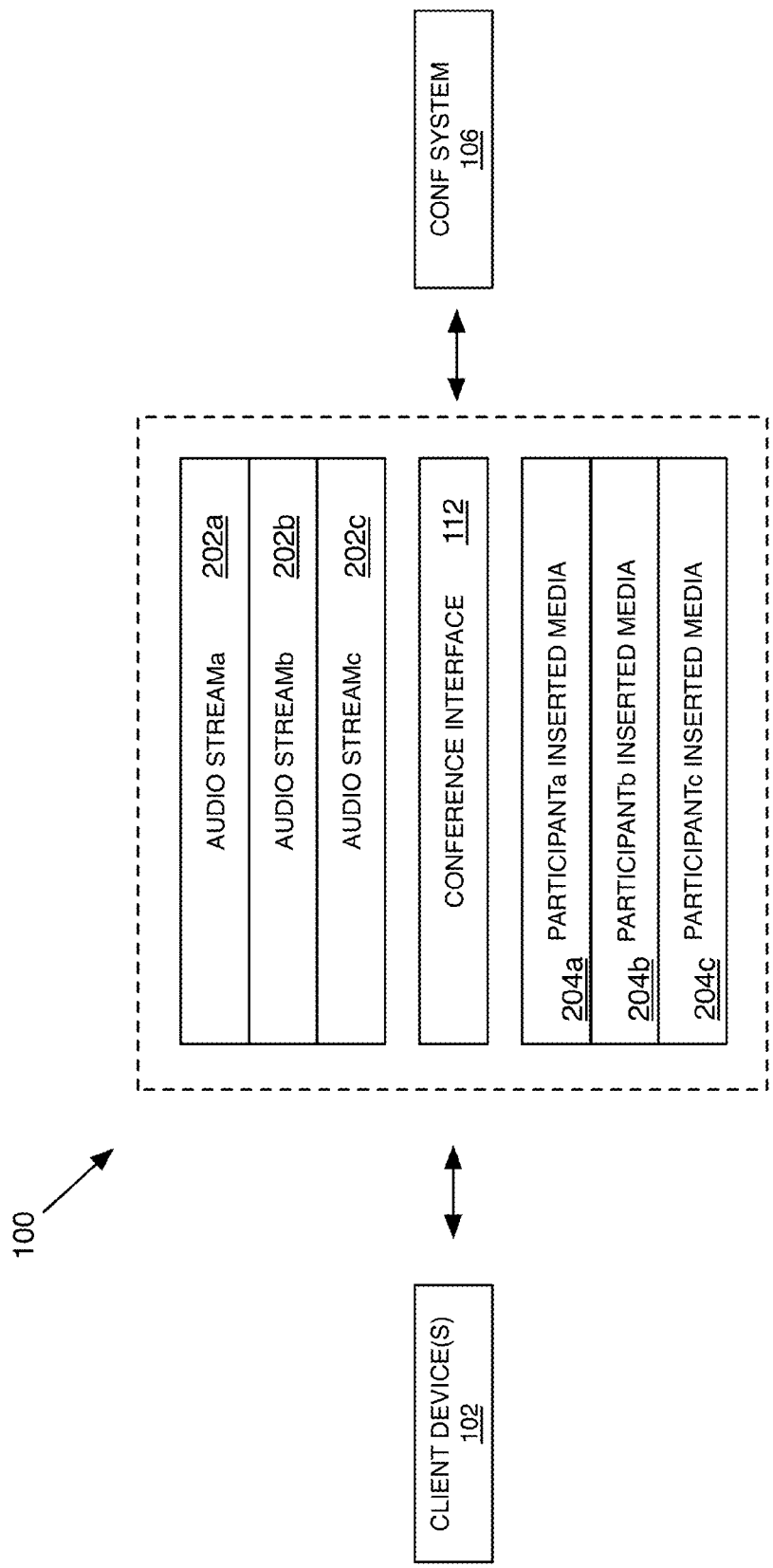
FIG. 2 is a block diagram illustrating an embodiment of the conference channels that may be selectively recorded, played back, and distributed via the conference record/playback system of FIG. 1.

The conferencing system 106 generally comprises a communication system for establishing an audio conference 108 between the client devices 102. The conferencing system 106 may support audio via a voice network and/or a data network. In one of a number of possible embodiments, the conferencing system 106 may be configured to support, among other platforms, a Voice Over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 106 may support various alternative platforms, technologies, protocols, standards, features, etc. Regardless of the communication infrastructure, the conferencing system 106 may be configured to establish an audio connection with the client devices 102, although in some embodiments the audio portion may be removed. As illustrated in FIG. 2, the conferencing system 106 may establish the audio conference 108 by combining audio streams 202a-202c associated with, for example, client devices 102a-102c, respectively.

In general, the conferencing system 106 establishes an audio conference 108 between the participants 104. One or more server(s) 110 may be configured to present the audio conference 108 and a conference user interface 112 to the client device(s) via a client 114 (e.g., a browser, one or more browser plug-ins, and/or a special-purpose client). The conference user interface 112 may include logic located and/or executed at the client device 102, the conferencing system 106, or any combination thereof, and may be presented to and displayed via a graphical user interface and an associated display (e.g., touchscreen display device or other display device).

Referring again to FIG. 1, to record and playback the audio conference 108 and the content displayed or otherwise presented in the conference user interface 112, the client device(s) 102 further comprise a record module 116, a playback module 118, a control module 120, and one or more buffer(s) and or storage device(s) 122. The record module 116, the playback module 118, and the control module 120 may be embodied in memory and executed by one or more processor(s) associated with the client device 102. In one embodiment, the modules 116, 118, and 120 may be integrated with the client 114, although it should be appreciated that the modules may comprise separate modules that interface with the client 114, the graphical user interface, the conference user interface 112, or other associated software and/or hardware programs. Furthermore, it should be appreciated that one or more of these modules may reside at the server(s) 110 or other components in the conferencing system 106.

The record module 116 is configured to capture content and/or functionality displayed or otherwise presented in the conference user interface 112, including audio streams 202 in the audio conference 108 and any other audio, video, graphics, images, documents, text, data, or other multimedia presented via the conference user interface 112. A user of the client device 102 may selectively control the record module 116 via the control module 120 and an associated user interface. The record module 116 may store the captured content in one or more buffers or storage devices 122. In an embodiment, the captured content is buffered in real-time during the conference for immediate or subsequent playback by the playback module 118, as described below in more detail. The record module 116 may comprise a screen capture functionality for capturing portions of (or the entire display region of) the conference user interface 112. The record module 116 may separately capture embedded audio and/or video content. At the conclusion of, or during, a conference, the captured content may be processed and stored in a playable format for storage, distribution, etc.

As illustrated in FIG. 1, the captured content may comprise data related to any of a plurality of conference channels 124 associated with the conference. Referring to FIG. 2, the conference channels 124 may comprise, for example, the audio streams 202 in the audio conference 108, the presentation content associated with the conference user interface 112, and any inserted media 204 from participants 104. The example illustrated in FIG. 2 comprises an audio conference 108 comprising three participants 104a-104c. Each participant has an associated audio stream 202a-202c. The inserted media 204 may comprise audio, video, documents, notes, images, graphics, data, etc. that a participant 104 may share, post, or otherwise present or display via the conference user interface 112.

In operation, each client device 102 in the conference record/playback system 100 may selectively capture one or more of the conference channels 124 for immediate or subsequent playback. The captured content may be stored on the respective client devices 102 or at the conferencing system 106. In this regard, the conferencing system 106 may include the record module 116 and the buffer(s) or storage device(s) 122.

Figure 3:
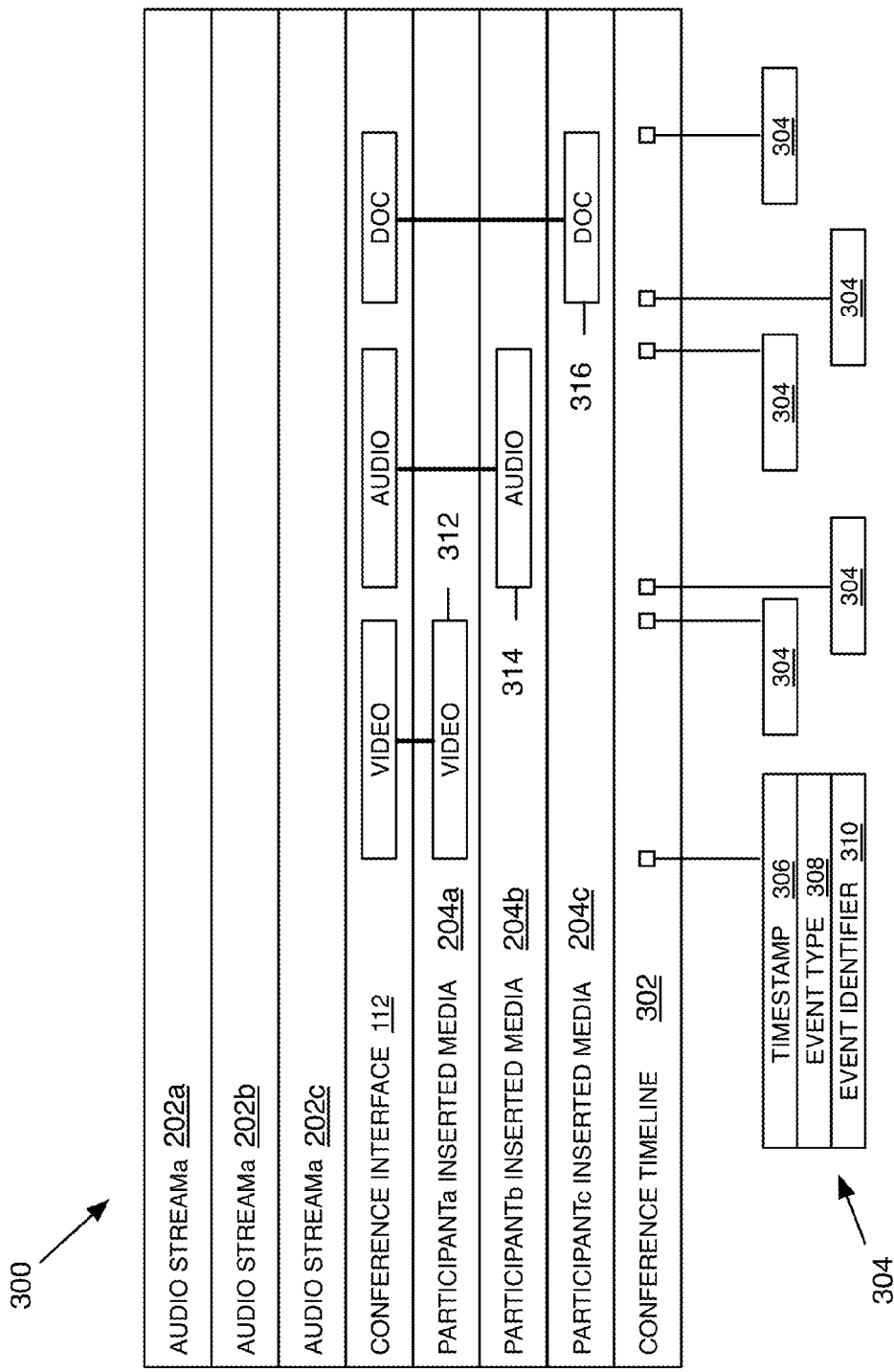
FIG. 3 is a data diagram of an embodiment of a recorded conference illustrating a plurality of synchronized conference channels.

FIG. 3 illustrates an embodiment of a data structure for a recorded conference 300, which has been recorded and stored via the conference record/playback system 100. The recorded conference 300 may be stored in any storage device in any computer-readable format. In an embodiment, the recorded conference 300 is configured as a playable media file or code. The recorded conference 300 may be transferred or distributed between participants 104 or to other recipients using any desirable transfer or distribution method. In an embodiment, a participant 104 who recorded a conference may transfer the recorded conference 300 to a participant profile or archive hosted by the conferencing system 106. The archive may store multiple recorded conferences 300 for subsequent access and/or distribution by the participant 104 or any other users. The users may download the recorded conference 300 for playback on a client device 102. In other embodiments, the recorded conference 300 may be streamed as an integrated video. In further embodiments, the recorded conference 300 may be referenced with a uniform resource locator (URL) or other embedded code that may be distributed to users. The participant 104 may also directly transfer or distribute the recorded conference 300 to other users via any of the above-described or other methods, including by electronic mail or via a social networking computer system or third party video distribution system.

As illustrated in FIG. 3, the recorded conference channels 124 are synchronized according to a master timeline associated with the conference (e.g., conference timeline 302). As part of the recording process, the record module 116 may generate timestamps 304 for the recorded content. In an embodiment, the timestamps 304 may include a time reference 306, an event type 308, and an event identifier 310. The time reference 306 defines a temporal location or position along the master timeline. The event type 308 and event identifier 310 may be used to catalogue specific types of events that occur in the conference. In the example illustrated in FIG. 3, a participant 102a may insert a video object 312 in the conference interface 112. The video object 312 may be shared with the other participants 102b and 102c via the conference interface 112, and an appropriate event type 312 and event identifier 310 may be created to identify the beginning and end of the inserted video. Later in the conference, the participant 102b may insert an audio object 314, and the participant 102c may display a document object 316. The record module 116 may generate a timestamp 304 to identify the beginning and end of the inserted audio and document.

Figure 4:
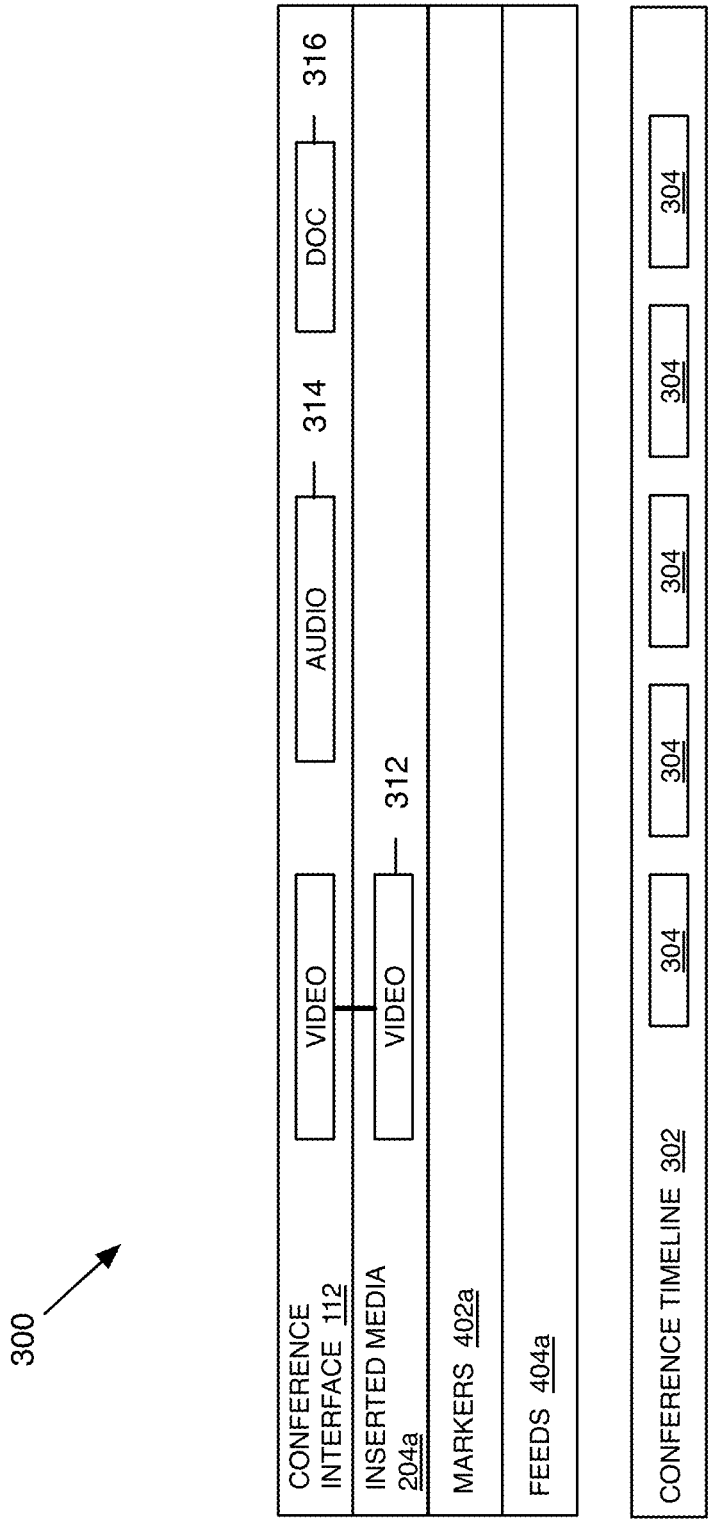
FIG. 4 is a data diagram illustrating additional embodiments of conference channels in the recorded conference of FIG. 3.

It should be appreciated that the record module 116 may be configured to generate timestamps 304 for any conference event related to the conference interface 112. In the embodiment illustrated in FIG. 4, timestamps 304 may be generated for participant-specified comments, notes, or markers 402. The markers 402 may be used to identify relevant points in the conference for subsequent review, or otherwise annotate the conference. Furthermore, timestamps 304 may be generated to identify incoming and/or outgoing posts associated with a data feed, such as, for example, a communication channel related to a social networking system, in the manner described in the above-referenced international patent application. Timestamps 304 for the markers 402 and feeds 404 may be categorized as private or public, which may define whether the channel components 124 are shared with other participants 104 or only available to the user who defined them.

Figure 5:
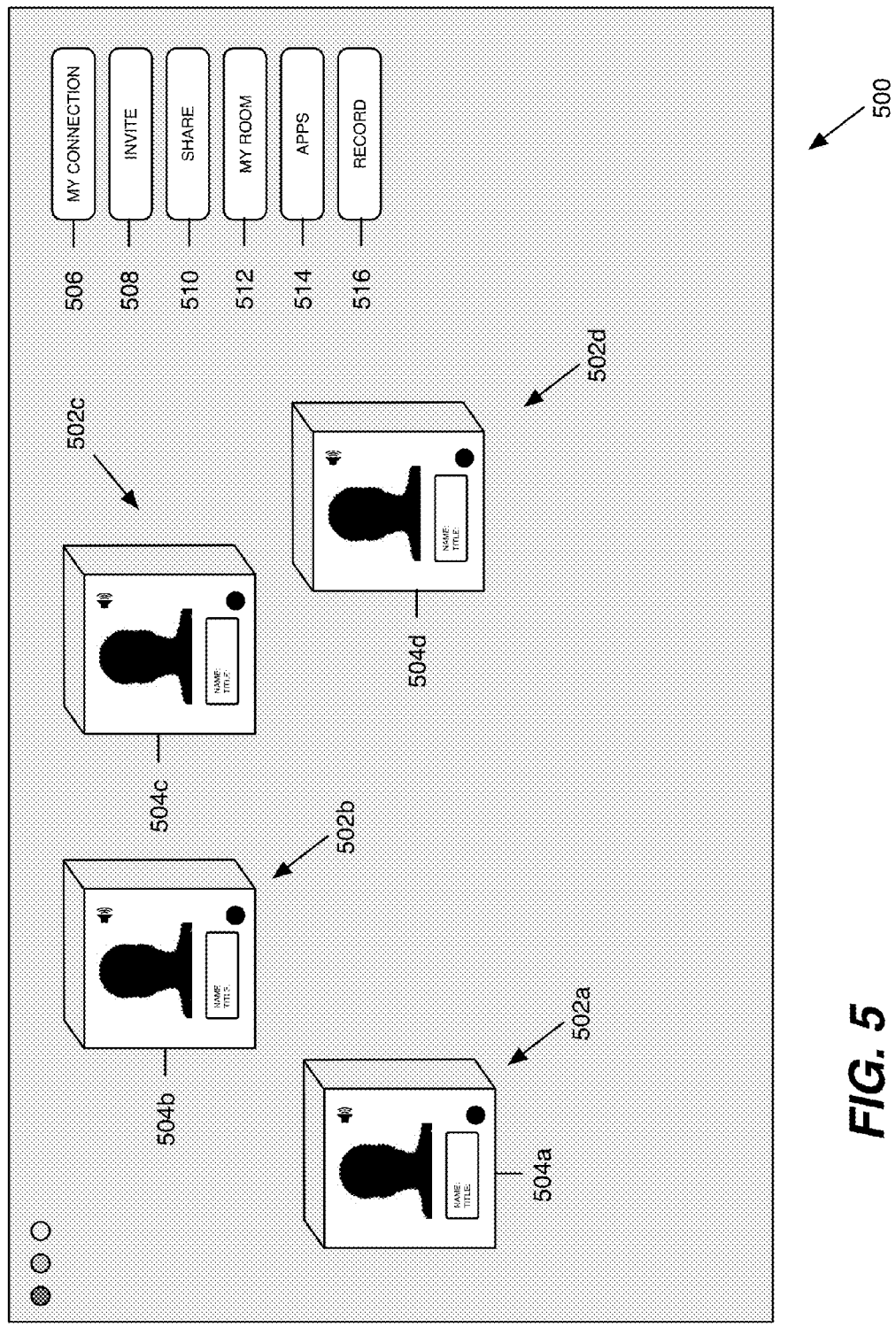
FIG. 5 is a user interface screen shot illustrating an embodiment of a conference interface implemented in the conference record/playback system of FIG. 1.

Having described the general structure and operation of the conference record/playback system 100, various additional features and functions will be described with reference to an exemplary embodiment of a conference interface 500 (FIG. 5). The conference interface 500 displays an interactive participant object 504 that identifies each participant 104 in the conference. The interactive participant object 504 may display similar information as described in the above-referenced international patent application (e.g., a graphical representation, profile information, an audio indicator, a business card component, etc.) and may implement similar or other user interface or other functions and features. In an embodiment, a business card component may "flip" the participant object 504 to display additional parameters. The interactive participant objects 504 may comprise further interactive functionality and visual effects. For example, the participant object 504 may comprise a cube having multiple display faces. When a participant 104 selects a user interface component, the cube may be expanded to display one or more faces of the object.

Figure 6:
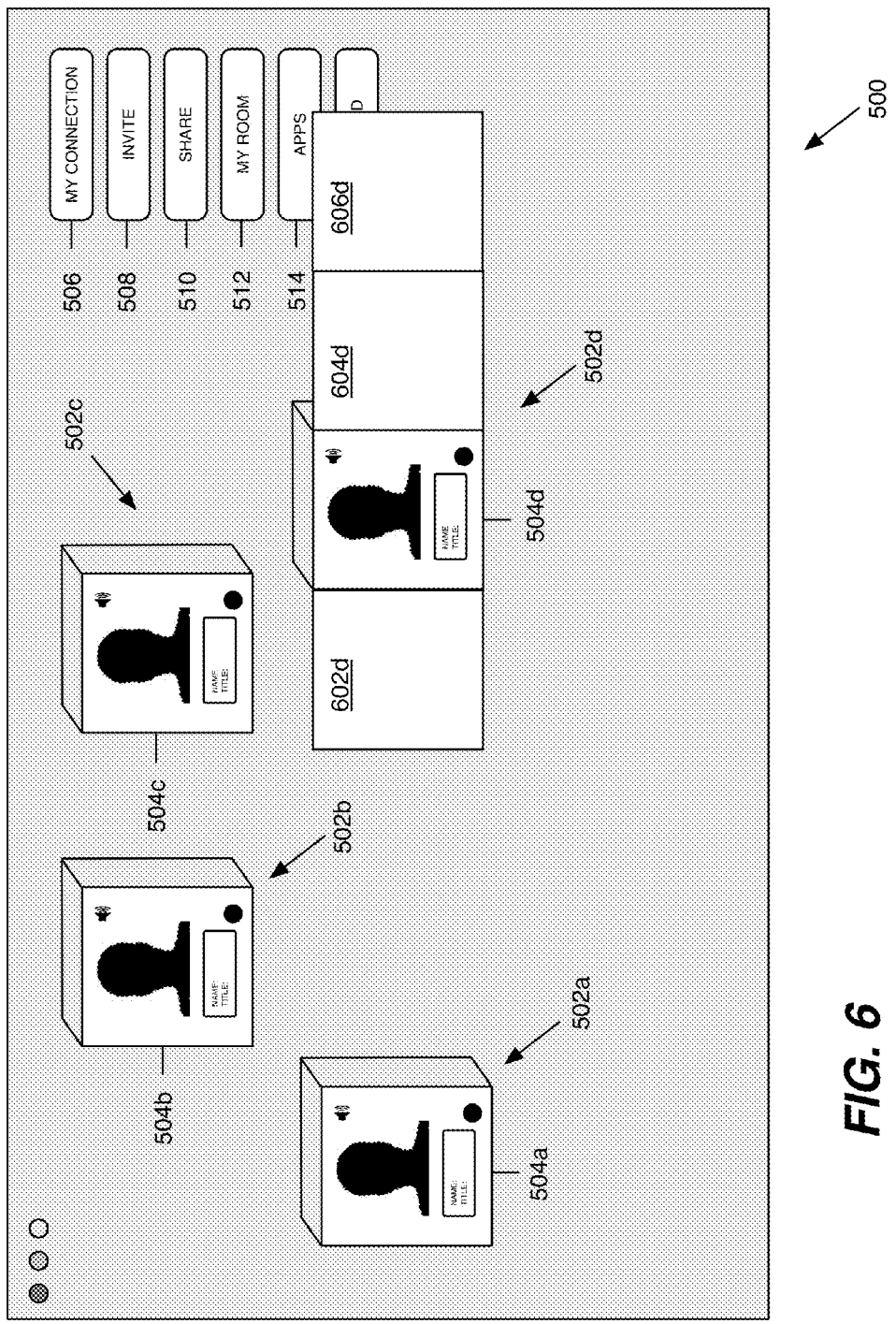
FIG. 6 illustrates an implementation of an interactive participant object in the conference interface of FIG. 5.
Figure 7:
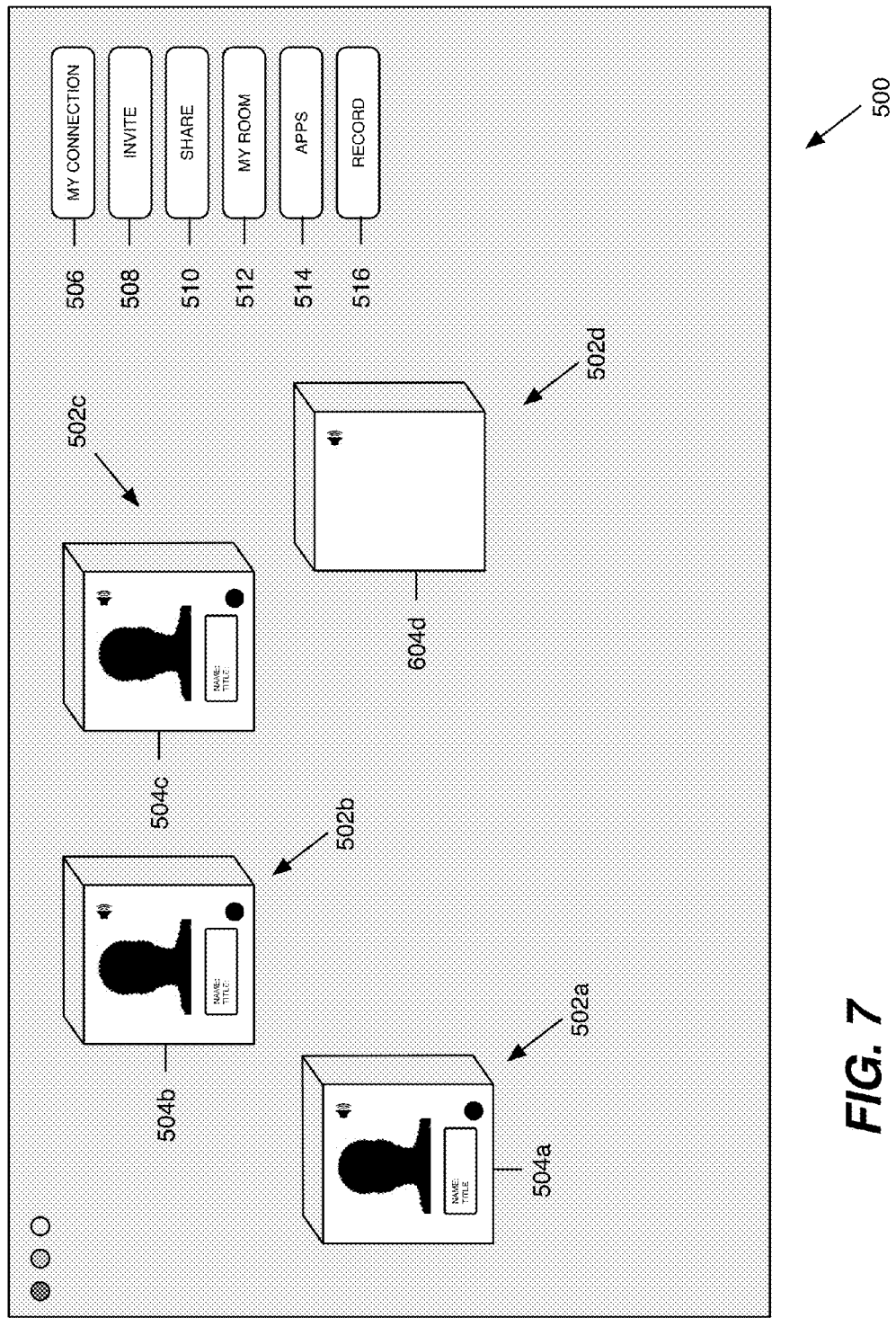
FIG. 7 illustrates another implementation of an interactive participant object in the conference interface of FIG. 5.

FIG. 6 illustrates the participant object 504d after is has been selected by one of the participants. The user selection may trigger the display of cube faces 602d, 604d, and 606d. Each face may display additional information about the associated participant. In an embodiment, the cube faces may be configurable by the participant and may display, for example, a social networking profile, updates to a social networking communication channel, video, graphics, images, or any other content. The cube faces may be further selected to return to the original collapsed cube. In another embodiment, the participant object 502 may be rotated (either automatically or via user selection) to display the respective cube faces 602d, 604d, and 606d. FIG. 7 shows the participant object 502b after it has been rotated to display cube face 604d. It should be appreciated that the participant objects 502 may be configured with additional or alternative visual effects and/or interactive functionality.

The conference interface 500 may comprise one or more selectable components for accessing various features. A my connection component 506 may launch a display for enabling a participant 104 to configure the existing connection between the client device 102 and the conferencing system 106. The participant 104 may disconnect a connection to the audio conference 108, establish a new connection to the audio conference 108 (e.g., by dial-out), or reconfigure the existing connection to the audio conference 108. In addition to configuring the audio connection, the participant 104 may also configure the connection to the online conference via the conference interface 500. In an embodiment, the connection to the online conference may be transferred to another client device 102 or another client 114 on an existing or other client device 102. This may enable the participant 104 to seamlessly maintain a presence in the online conference during the transfer.

Figure 8:
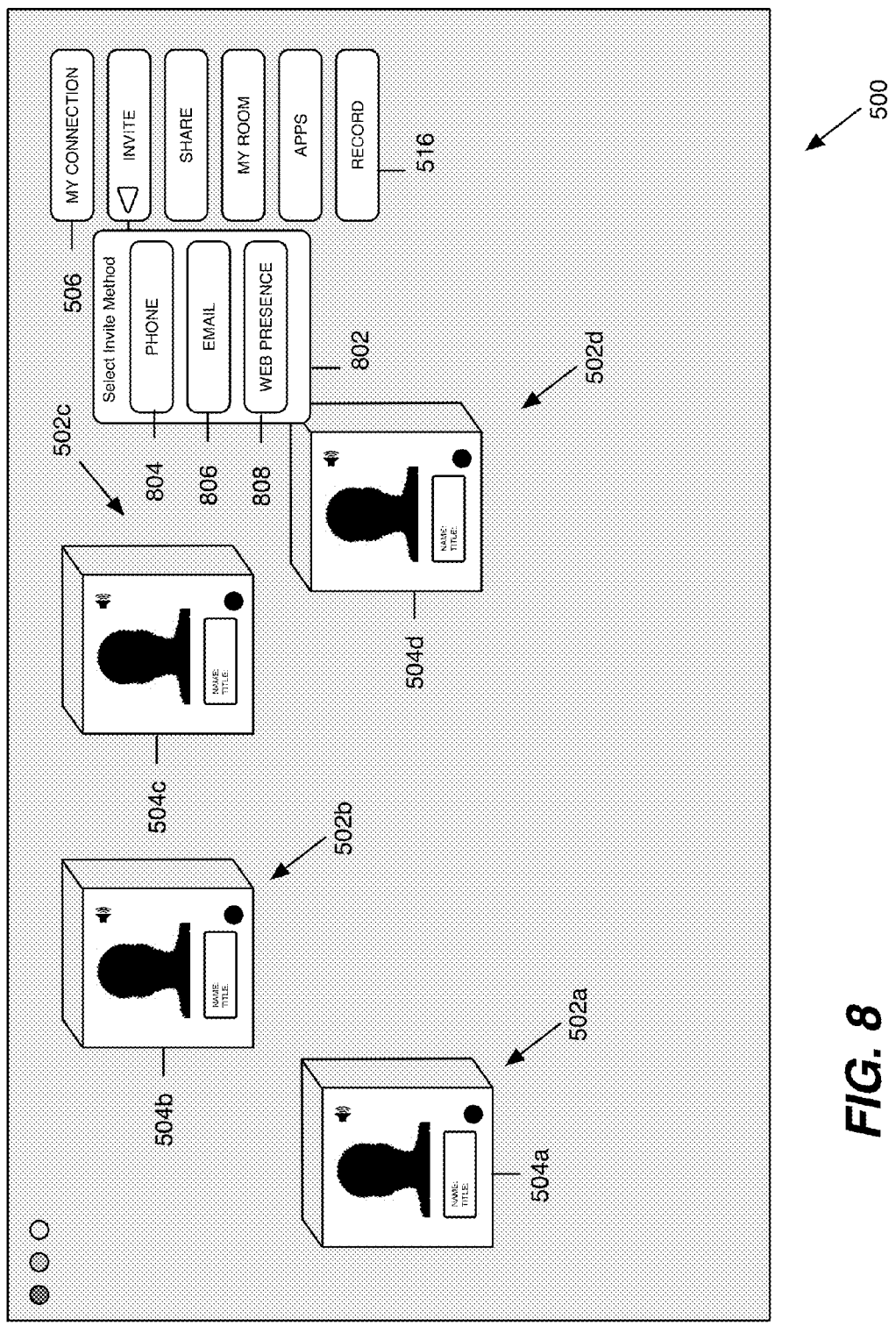
FIG. 8 illustrates an embodiment of an "invite" menu in the conference interface of FIG. 5 for enabling a participant to invite additional participants.

An invite component 508 may launch a menu 802 (FIG. 8) for enabling a participant 104 to invite additional participants 104 to the online conference. As illustrated in FIG. 8, additional participants may be invited by, for example, dialing out to a telephone number (phone component 804), sending an email including information for accessing the conferencing system 106 (email component 806), or sending a message to a web service (web presence component 808), such as, for example, a social networking system.

Figure 9:
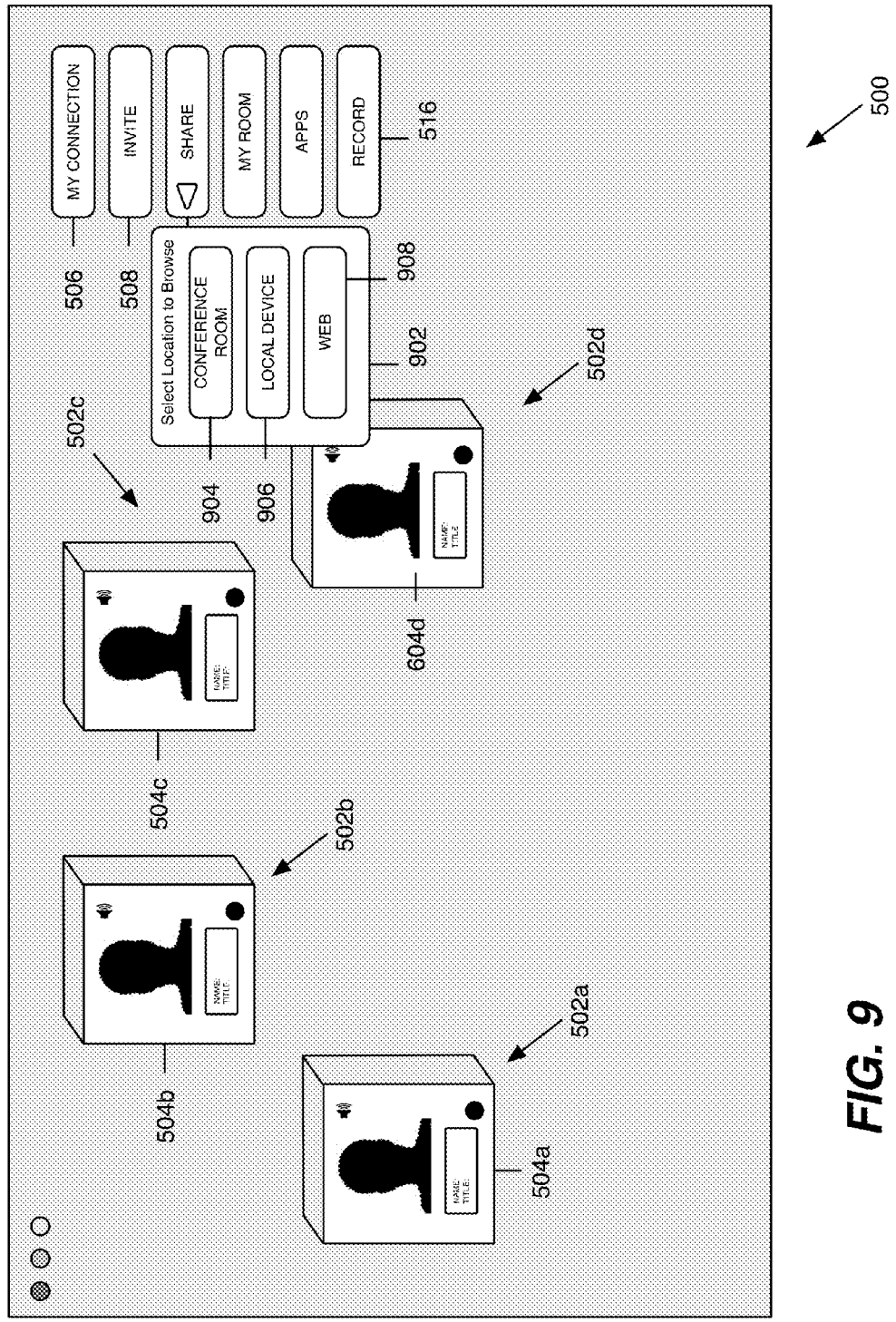
FIG. 9 illustrates an embodiment of a "share" menu in the conference interface of FIG. 5 for enabling a participant to share information resources with participants.
Figure 10:
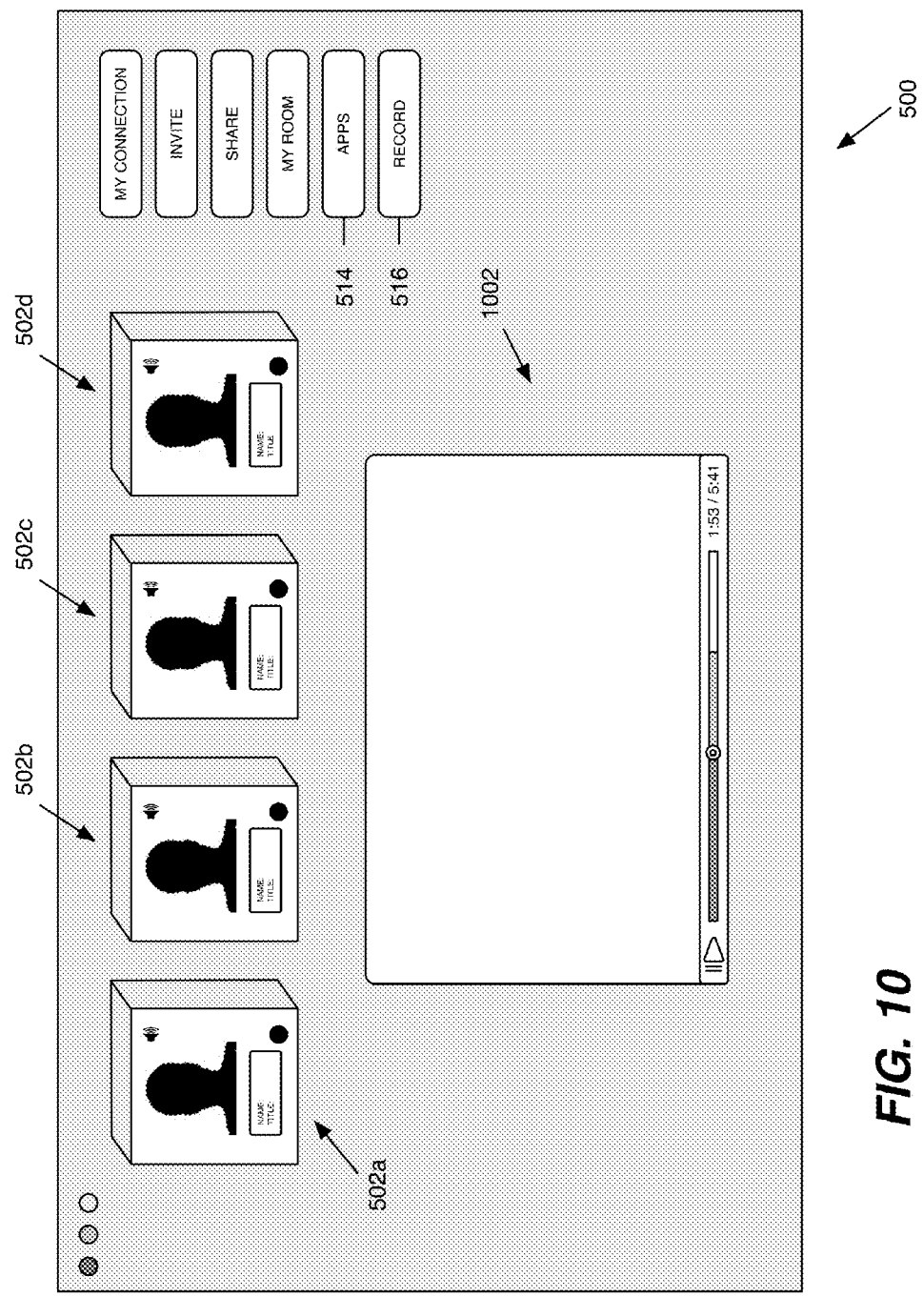
FIG. 10 illustrates the conference interface of FIG. 5 after the participant has inserted a web video.

A share component 510 may launch a menu 902 (FIG. 9) for enabling a participant 104 to insert and share media with other participants in the online conference. The menu 902 may prompt the participant 104 to specify a browse location for selecting the media. A conference room component 904 may display media stored by the conferencing system 106. A local device component 906 may display a file browser for enabling the participant 104 to select files located on the client device 102. A web component 908 may display available media hosted by a web service, such as, for example a third party video, audio, or document hosting service. FIG. 10 illustrates the conference interface 500 after a participant 104 has identified a web-based video 1002. The client device 102 may launch the web-based video 1002 and the conferencing system 106 shares it with all of the participants 104 via the conference interface 500.

In an embodiment, when the participant launches the web-based video 1002 (or other user interface component, presentation display, etc.), the component may be introduced in the conference interface 500 as a "fly-in" component to provide a more visually engaging experience. For instance, the component may appear to be raised from a bottom portion of the conference interface 500 and the participant objects 502 may be automatically rearranged in the remaining available screen space (or hidden) to accommodate the component. The movement of the component may originate from any portion of the screen and may implement any desirable animation or effects. In one implementation, the "fly-in" component is configured to simulate the motion of a physical screen being raised from the "floor" of the screen, with the participant objects 502 being "pushed aside" by the display or otherwise rearranged or hidden. In another embodiment, the participant objects 502 may be displayed in the background with the "fly-in" component being raised in the foreground.

When the web-based video 1002 (or other presentation display) is completed or otherwise deactivated manually or automatically, the animation or effects may be reversed and the participant objects 502 returned to an original or other layout and the "fly-in" component moved to the original or other state. It should be appreciated that the "fly-in" component animation and/or effects may be used with any desirable presentation content and/or functionality (e.g., a display, pane, window, etc.).

A my room component 512 may launch a display for enabling a participant 104 to configure the appearance of the conference interface 500. The participant 104 may configure the arrangement of the participant objects 502, specify a location view (as described in the above-reference international patent application), or configure any other presentation parameter.

Figure 11:
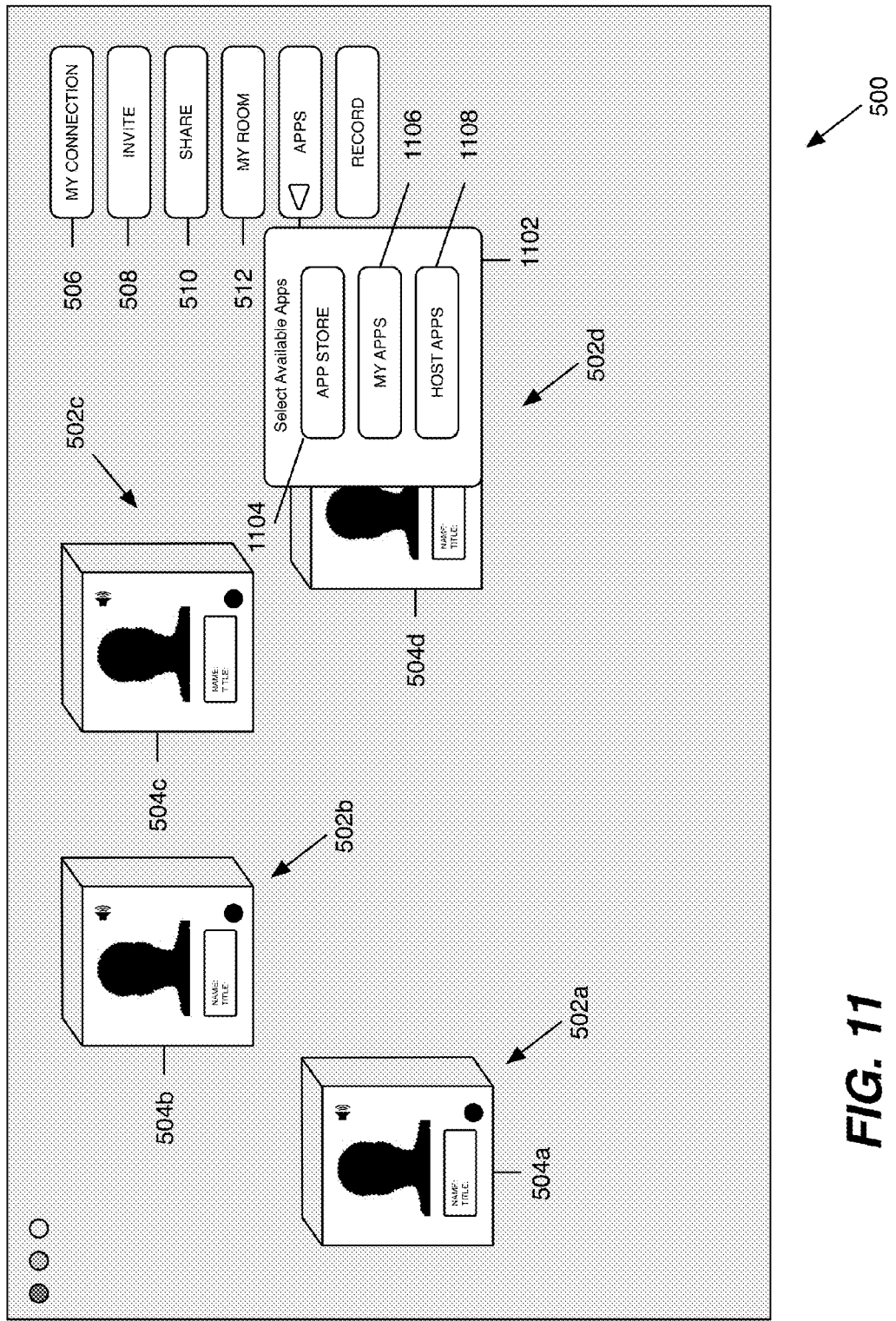
FIG. 11 illustrates an embodiment of an "apps" menu in the conference interface of FIG. 5 for enabling participants to access conference apps.

An apps component 514 may launch a menu 1102 (FIG. 11) for enabling a participant 104 to launch conference applications. As described above, the conferencing system 106 may host a conference apps store for purchasing various conference applications. An app store component 1104 may launch the app store where the participant 104 may purchase conference applications. A my apps component 1106 may launch a display for enabling the participant 104 to select from applications that have already been purchased or are otherwise available to the participant 104. A host apps component 1108 may display conferencing applications that have been made available by the host of the online conference.

Figure 12:
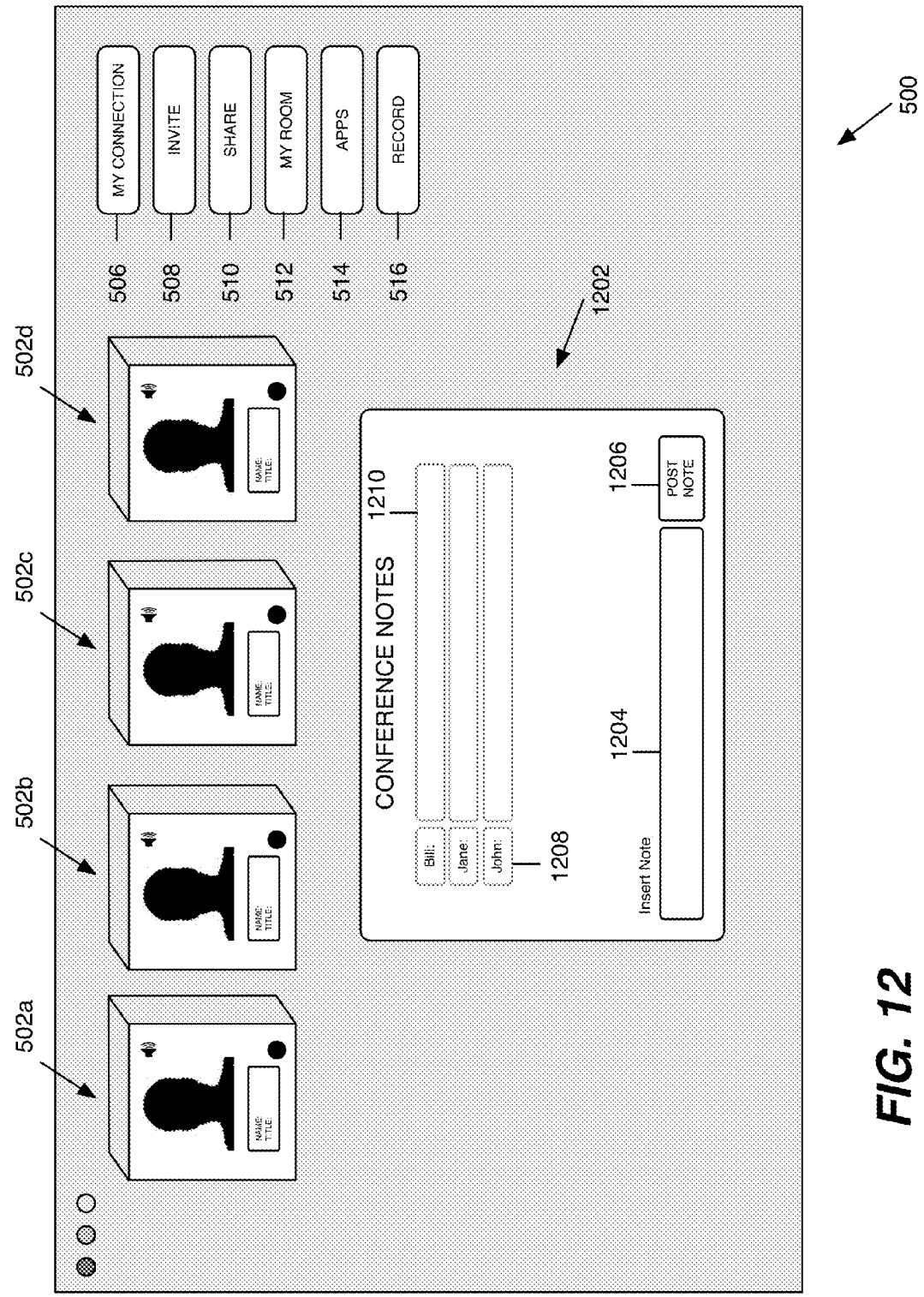
FIG. 12 illustrates the conference interface of FIG. 5 after the participant has launched a conference notes application.

FIG. 12 illustrates the conference interface 500 after the participant 104 has launched a conference notes application 1202. The notes application 1202 displays a text insertion component 1204 for enabling participants 104 to insert notes to a notes section. A participant 104 may insert a note and select the post note component 1206, which adds as a group note 1210 with an indication 1208 of the participant 104.

Figure 13:
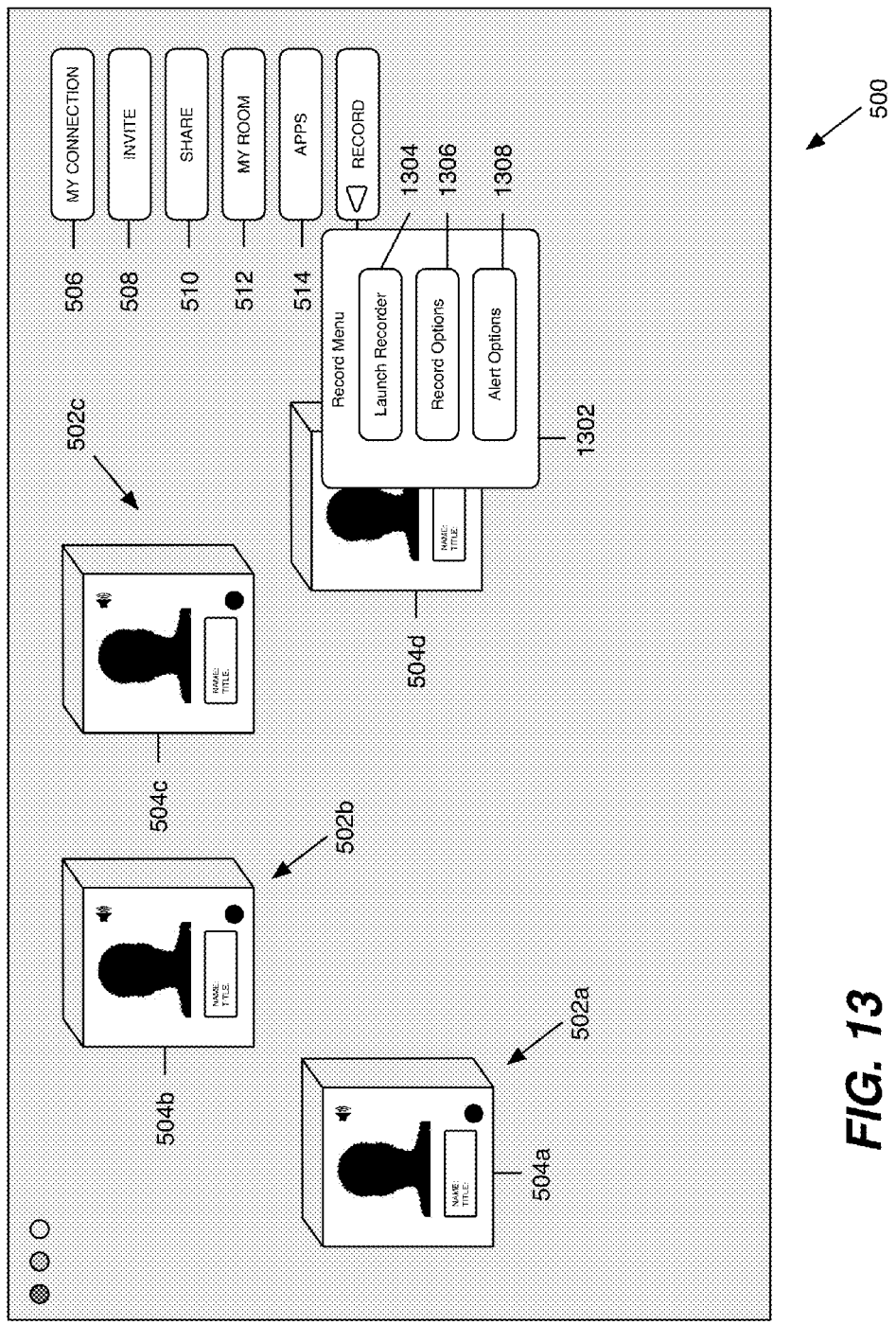
FIG. 13 illustrates an embodiment of a "record" menu in the conference interface of FIG. 5 for enabling a participant to launch a record/playback controller and configure record and alert options.
Figure 14:
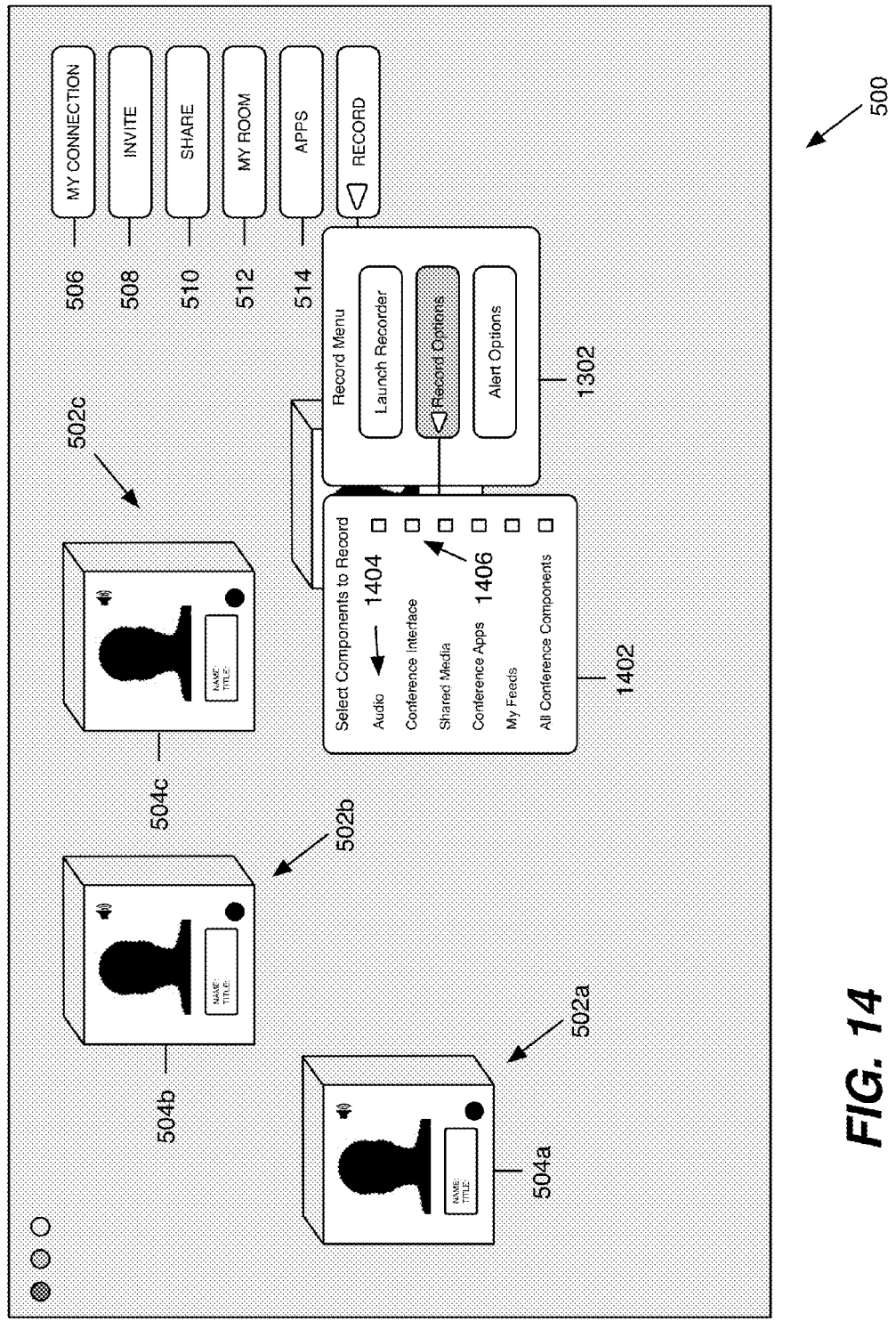
FIG. 14 illustrates an embodiment of a "record options" menu in the conference interface of FIG. 5.

A record component 516 may launch a display 1302 (FIG. 13) for enabling a participant 104 to launch a conference recorder (component 1304) or configure record options (component 1306) or alert options (1308). As illustrated in FIG. 14, the record options component 1306 may launch a display 1402 for enabling participants 104 to select (e.g., via check boxes 1406) which components 1404 of the online conference to record. In the embodiment illustrated in FIG. 14, the participant 104 may select to record according to one or more of the following parameters: audio, conference interface, shared media, conference apps, my feeds, or all conference components. When activated, the record module 116 (FIG. 1) will record and store the selected components.

Figure 15:
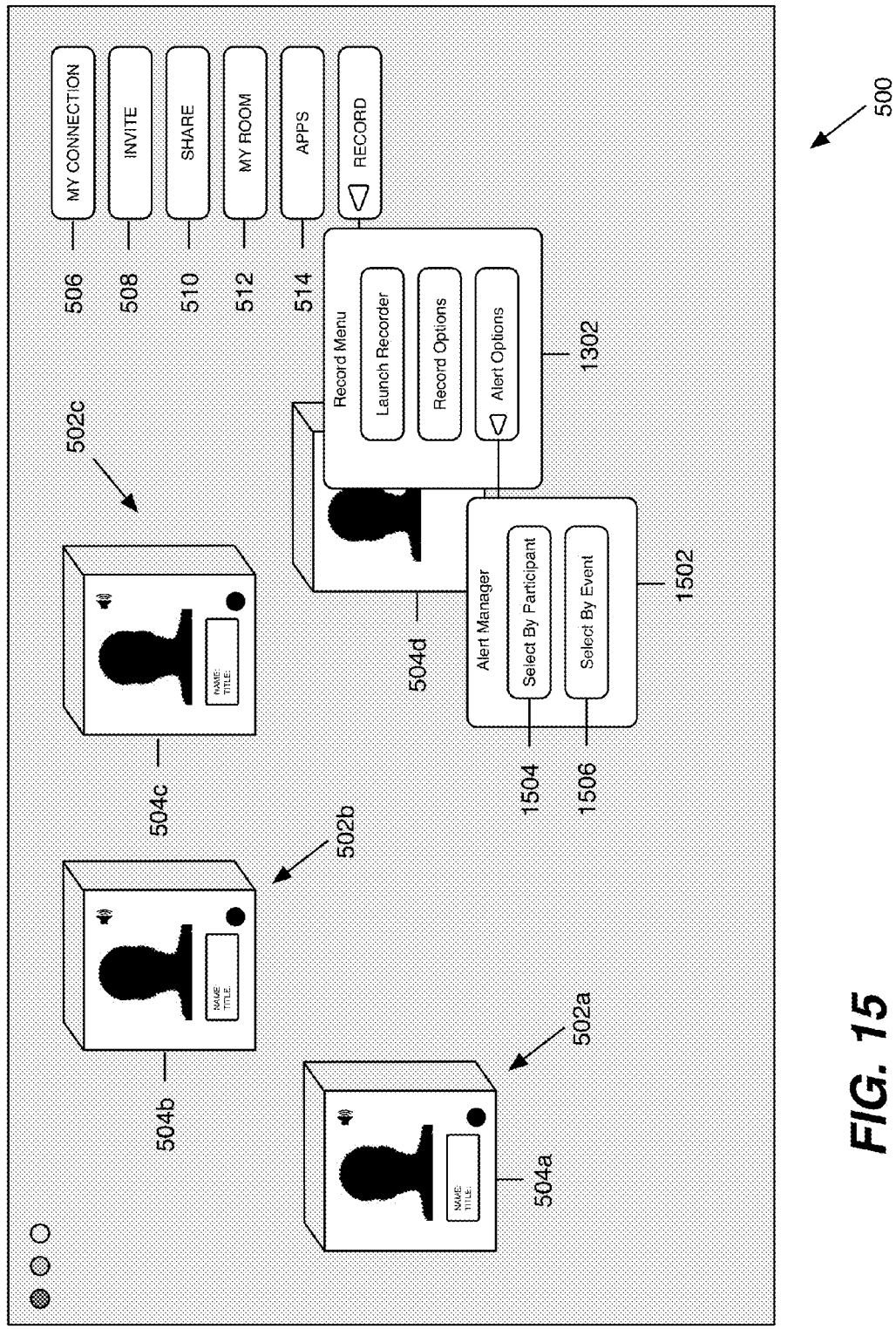
FIG. 15 illustrates an embodiment of an "alert options" menu in the conference interface of FIG. 5.

As illustrated in FIG. 15, the alert options component 1302 may launch an alerts manager 1502 for enabling the participants 104 to configure the conference interface 500 for various in-conference alerts. For example, the conference interface 500 may be configured to alert the participant when certain events occur in the conference (component 1506) such as, for example, when a video is shared, a conference application is launched, etc. Other types of participant-based alerts may be generated (component 1504). The participant 104 may wish to be alerted via the conference interface 500 when a particular participant 104 is speaking or when the participant takes a certain action in the conference.

Figure 16:
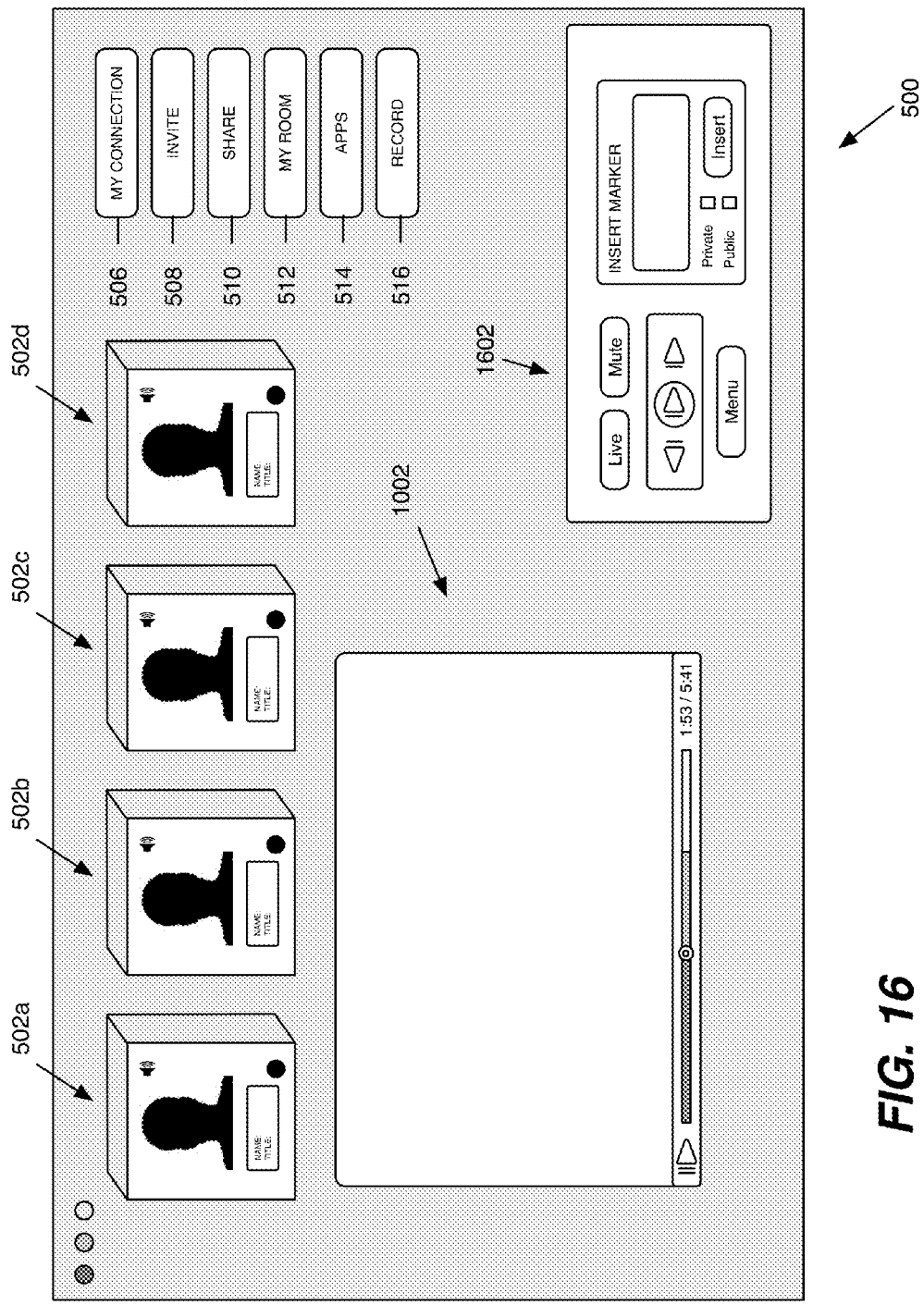
FIG. 16 illustrates the conference interface of FIG. 5 with a record/playback navigation controller.
Figure 17:
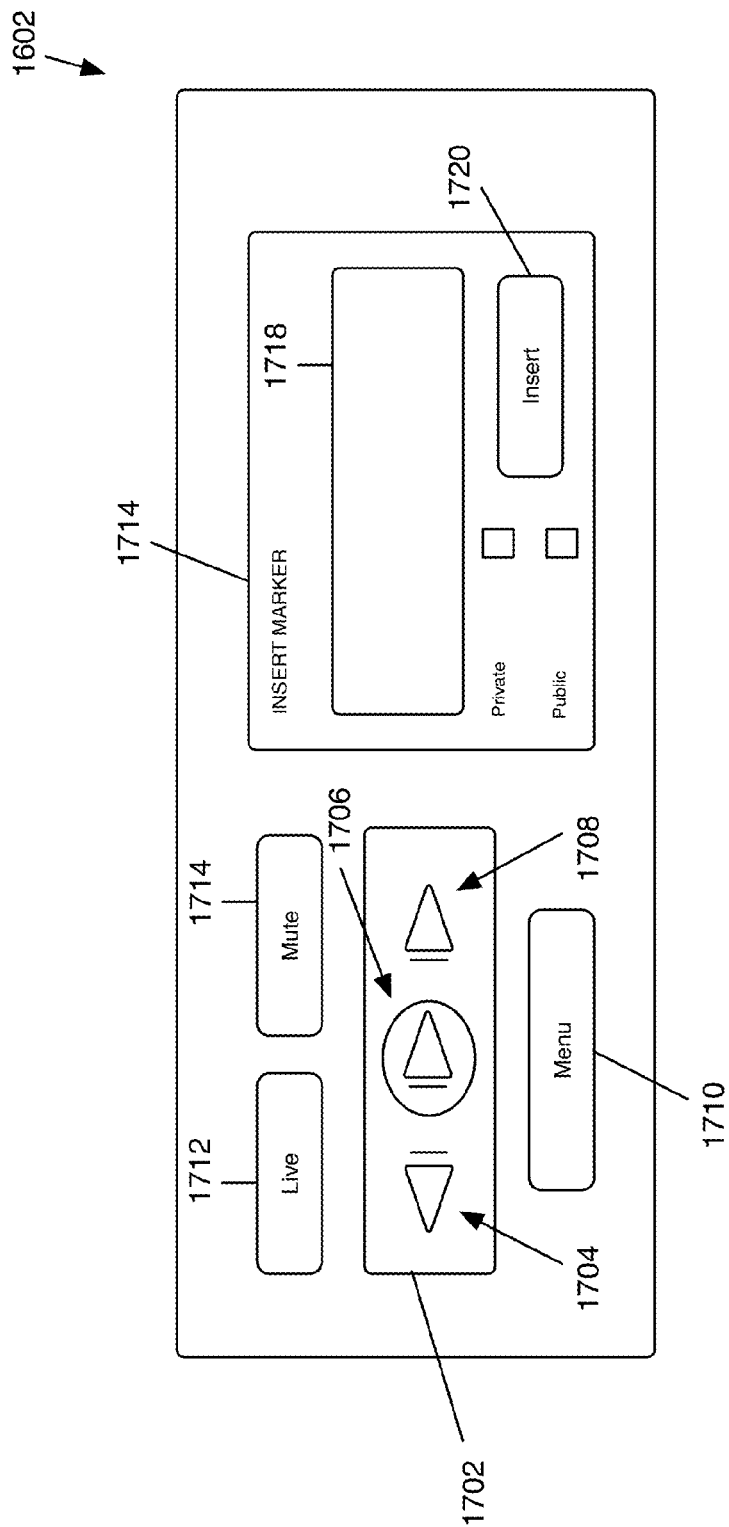
FIG. 17 is a more detailed illustration of the record/playback navigation controller of FIG. 16.

When the conference recorder is launched and the record module 116 is recording the conference, the conference interface 500 may present a record/playback navigation controller 1602 (FIG. 16) for facilitating various record and playback features. The record/navigation controller 1602 comprises the user interface associated with the control module 120 (FIG. 1). As illustrated in the embodiment of FIG. 17. The controller 1602 comprises a navigation controller 1702 comprising a pause/play input 1706, a rewind input 1704, and a forward input 1708 for initiating the respective playback functions. The pause/play input 1706 toggles between the functions of pausing the conference and playing the conference. The rewind input 1706 and the forward input 1704 enable the participant 104 to navigate to earlier and later locations or positions on the conference timeline 302 (FIG. 2) of the conference during playback. During the playback function, a participant 104 may select the live input 1712 to automatically return to a current location or position on the conference timeline 302 (generally referred to as "going live" in the online conference). The mute input 1714 mutes the audio conference 108.

The record/playback navigation controller 1602 may further comprise an insert marker portion 1714 for enabling participants 104 to insert comments, tags, etc. (markers 402—FIG. 4) into the conference timeline 302. The comment may be added to a text insertion component 1718 and specified as a private or public comment via, for example, applicable check boxes or other controls. When the insert component 1720 is selected, a timestamp 304 (FIG. 3) comprising the comment is generated.

Figure 18:
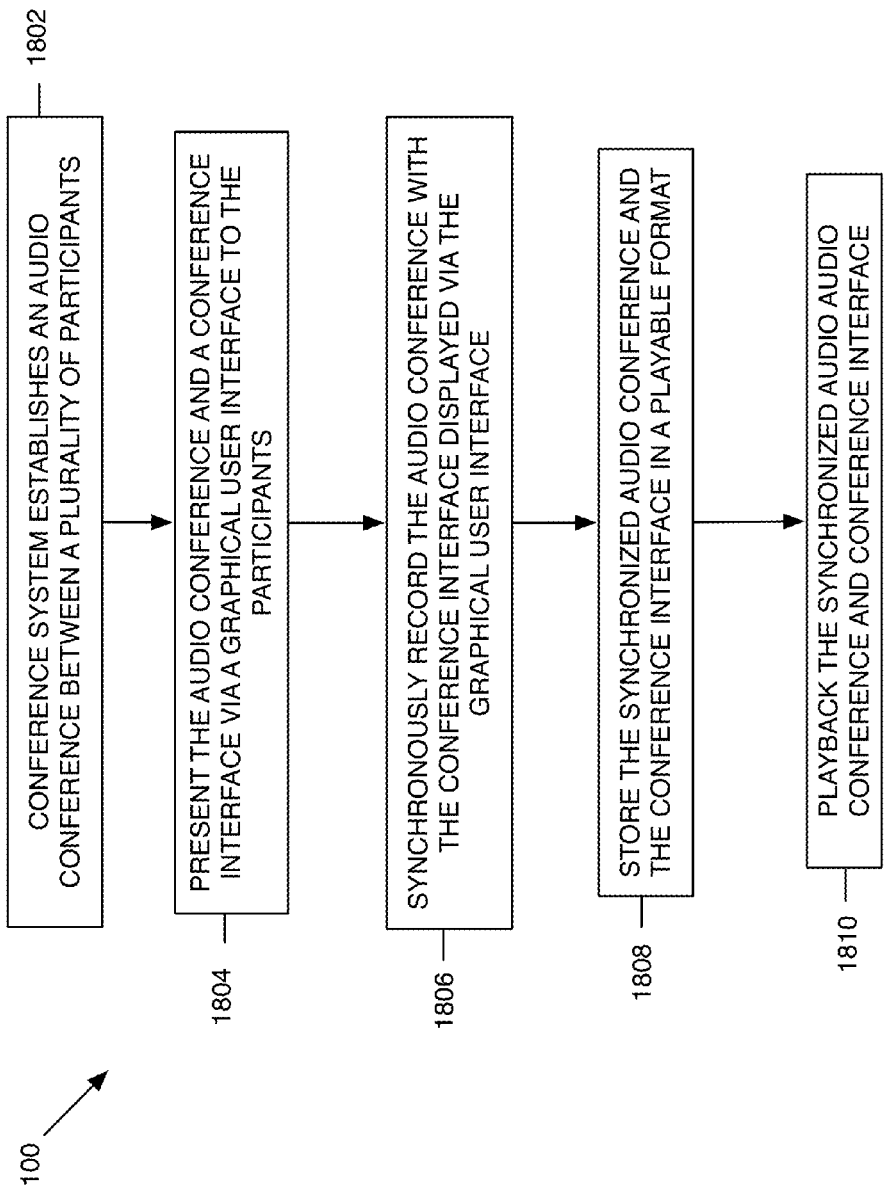
FIG. 18 is a flowchart illustrating the architecture, operation, and/or functionality of an embodiment of the conference record/playback system of FIG. 1.

FIG. 18 is a flowchart illustrating the architecture, operation, and/or functionality of an embodiment of the conference record/playback system 100 of FIG. 1 described above. At block 1802, the conferencing system 106 establishes the audio conference 108 between a plurality of participants 104. At block 1804, the conference interface 500 and audio conference 108 are presented to the respective client devices 102.

At block 1806, one or more of the client devices 102 synchronously record the audio conference 108 and one or more portions of the content presented in the conference interface 500. As mentioned above, one or more of the conference channels 124 may be recorded. At block 1808, the synchronized audio and/or video (and any other content presented in the conference interface 500) are stored and played back (block 1810) to the applicable participants 104.

It should be appreciated that the conference record/playback system 100 may be configured in an "always on" record mode or operation, in which an online conference is automatically recorded. The "always on" mode may be configured as a default setting of conferencing system 106 in which all online conferences are automatically recorded. The "always on" mode may be selectively activated/deactivated by a participant 104 or controlled by the conference system 106, conference interface 500, or client 114 according to, for example, user account/profile settings or any other user-configurable rules. In an embodiment, a participant 104 may customize the "always on" mode to be active/inactive based on parameters, such as, user account, conference type (e.g., intra-company, department, public/private, etc.), specific participant(s), number of participants, day, time of day, agenda, etc.

One of ordinary skill in the art will appreciate that the "always on" mode provides a unique feature for enabling a participant 104 to join an online conference already in progress. For example, when a new participant 104 joins an online conference in progress (e.g., 15 minutes after the scheduled starting time) and assuming it has been recorded as described above, the new participant 104 may automatically, manually, or otherwise "rewind" the online conference to an earlier location or position on the conference timeline 302 (FIG. 3). In response to receiving a request to join the online conference from the new participant 104, the conferencing system 106 may automatically initiate playback from a recording start location or any other "earlier" location, or alternatively prompt the new participant 104 via the conference interface 500 to specify whether to join live or from the start recording location. In other embodiments, the conferencing system 106 may initially add the new participant 104 to the live conference, and then prompt the new participant 104 to navigate to the recording start position or any earlier location.

It should be appreciated that the "always on" mode may be further configured to enable the new participant 104 to customize the recording start position. For example, upon joining an online conference already in progress, a new participant 104 may wish to begin playback at a specific conference event 304 (FIG. 3) rather than the beginning of the online conference. The new participant 104 may specify to begin playback at any desirable event, including, for example, when a specific person entered the online conference, when a particular topic was discussed, when certain content has been shared or functionality activated via the conference interface 500, or based on any other desirable parameter, rule, etc.

Figure 19:
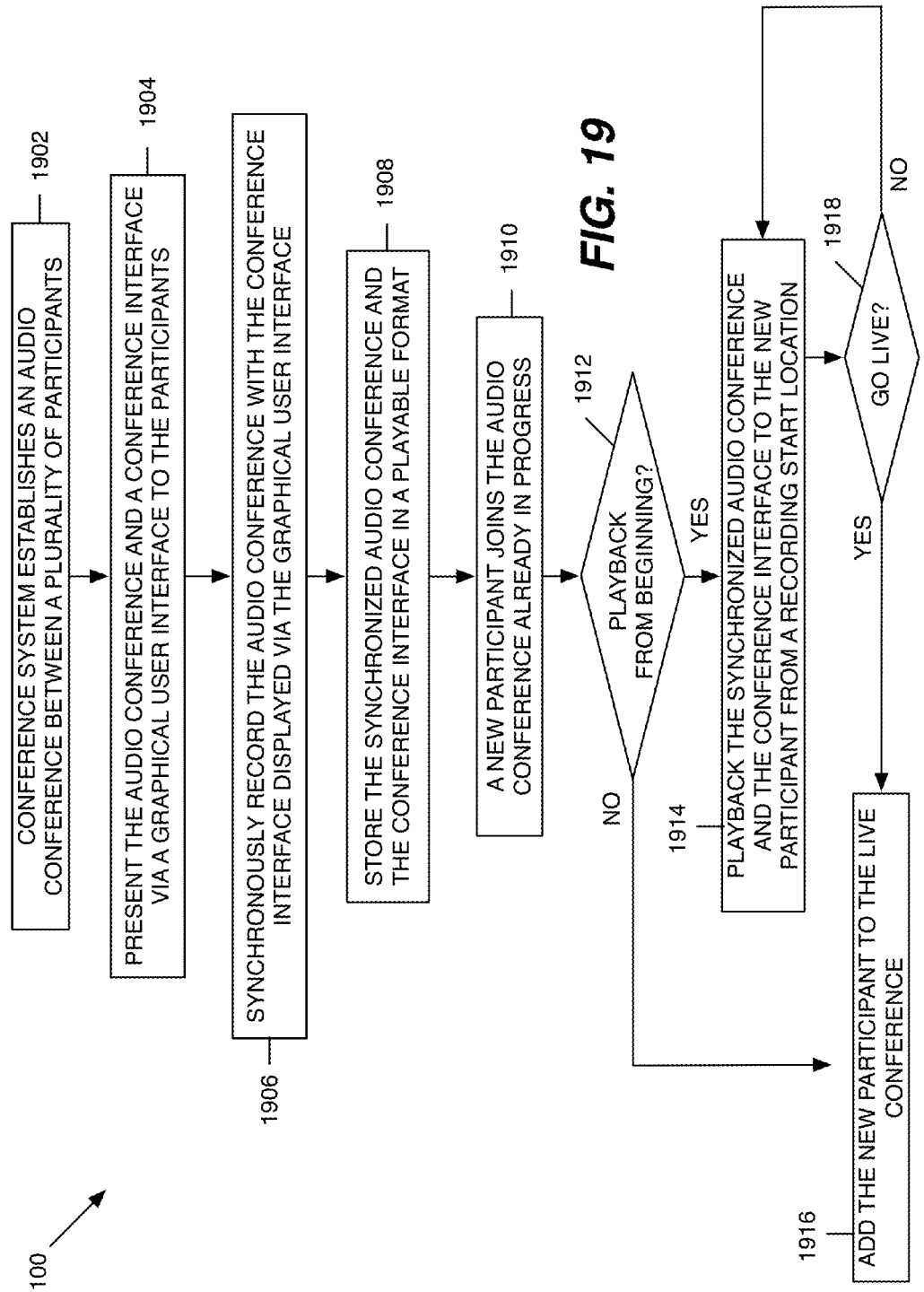
FIG. 19 is a flowchart illustrating the architecture, operation, and/or functionality of another embodiment of the conference record/playback system of FIG. 1.

FIG. 19 is a flowchart illustrating the architecture, operation, and/or functionality of another embodiment of the conference record/playback system 100 for controlling the manner in which a new participant joins an online conference already in progress when the "always on" mode has been activated. At block 1902, the conferencing system 106 establishes the audio conference 108 between a plurality of participants 104. At block 1904, the conference interface 500 and the audio conference 108 are presented to the respective client devices 102. At block 1906, one or more of the client devices 102 and/or the conferencing system 106 synchronously records the audio conference 108 and one or more portions of the content presented in the conference interface 500. At block 1908, the synchronized audio and/or video (and any other content presented in the conference interface 500) are stored. As described above, the content may be stored locally at one or more of the client devices 102, the conferencing system 106, or any combination thereof.

At block 1910, a new participant 104 requests to join the online conference already in progress and established at block 1902. The new participant 104 may request to join the online conference in any of the ways described above or in the above-referenced international patent application. At decision block 1912, the conferencing system 106 and/or the client 114 may determine the appropriate method for adding the new participant 104 to the online conference. For example, it may be determined to add the new participant 104 to the live conference (block 1916). If the "always on" mode is activated, at block 1914, the conferencing system 106 may playback the synchronized audio conference 108 and any applicable content from the recording start location on the conference timeline 302 or any other customized start location. After playback begins, the new participant 104 may navigate the recorded conference 300 via the record/playback navigation controller 1602 (FIG. 16) or "go live" (decision block 1918) by, for example, selecting the live input 1712 (FIG. 17) in the conference interface 500.

Figure 20:
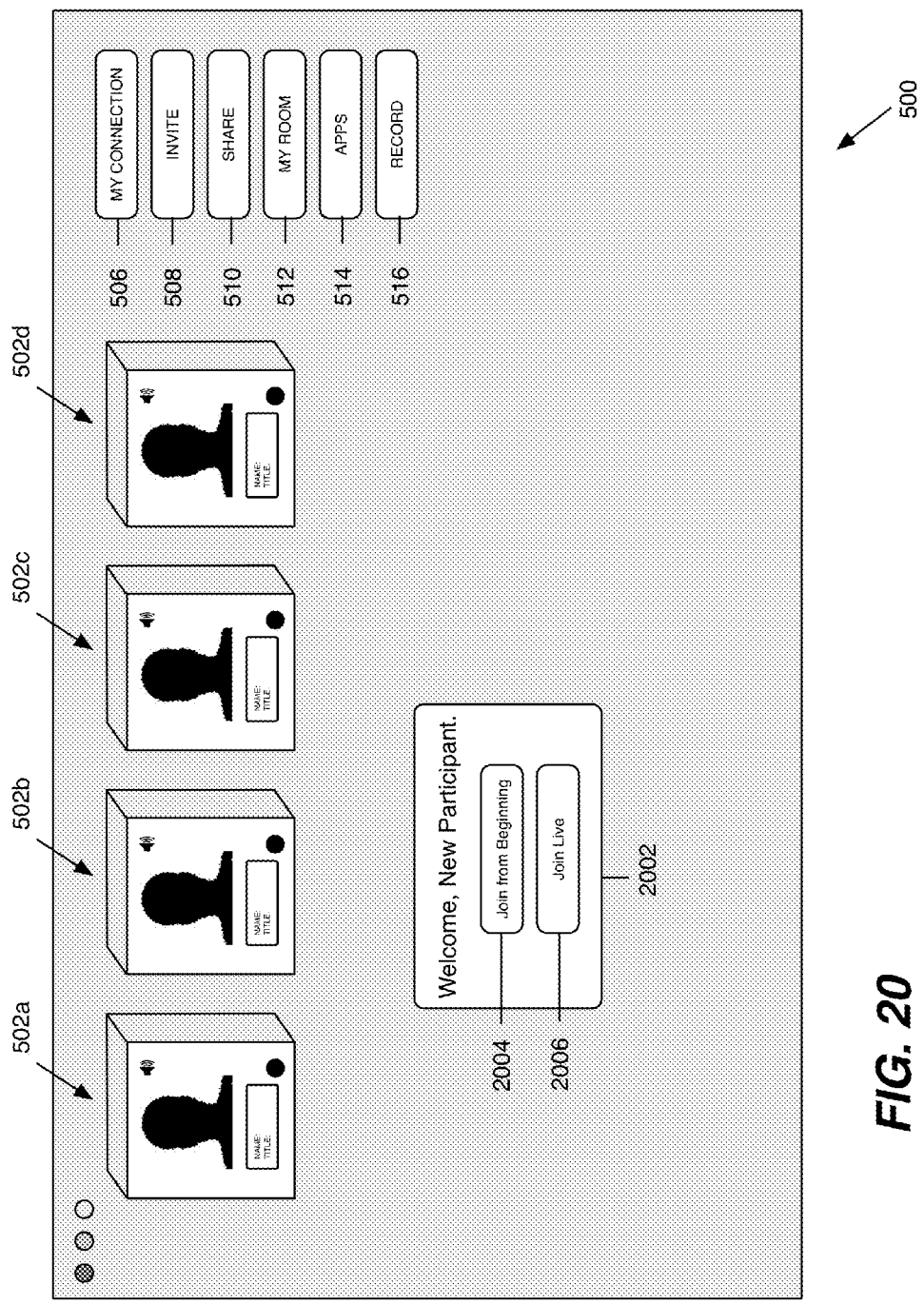
FIG. 20 is a user interface screen shot illustrating an embodiment of a conference interface implemented in the conference record/playback system of FIG. 1 for enabling a new participant to specify whether to join the online conference live or from a recording start location.
Figure 21:
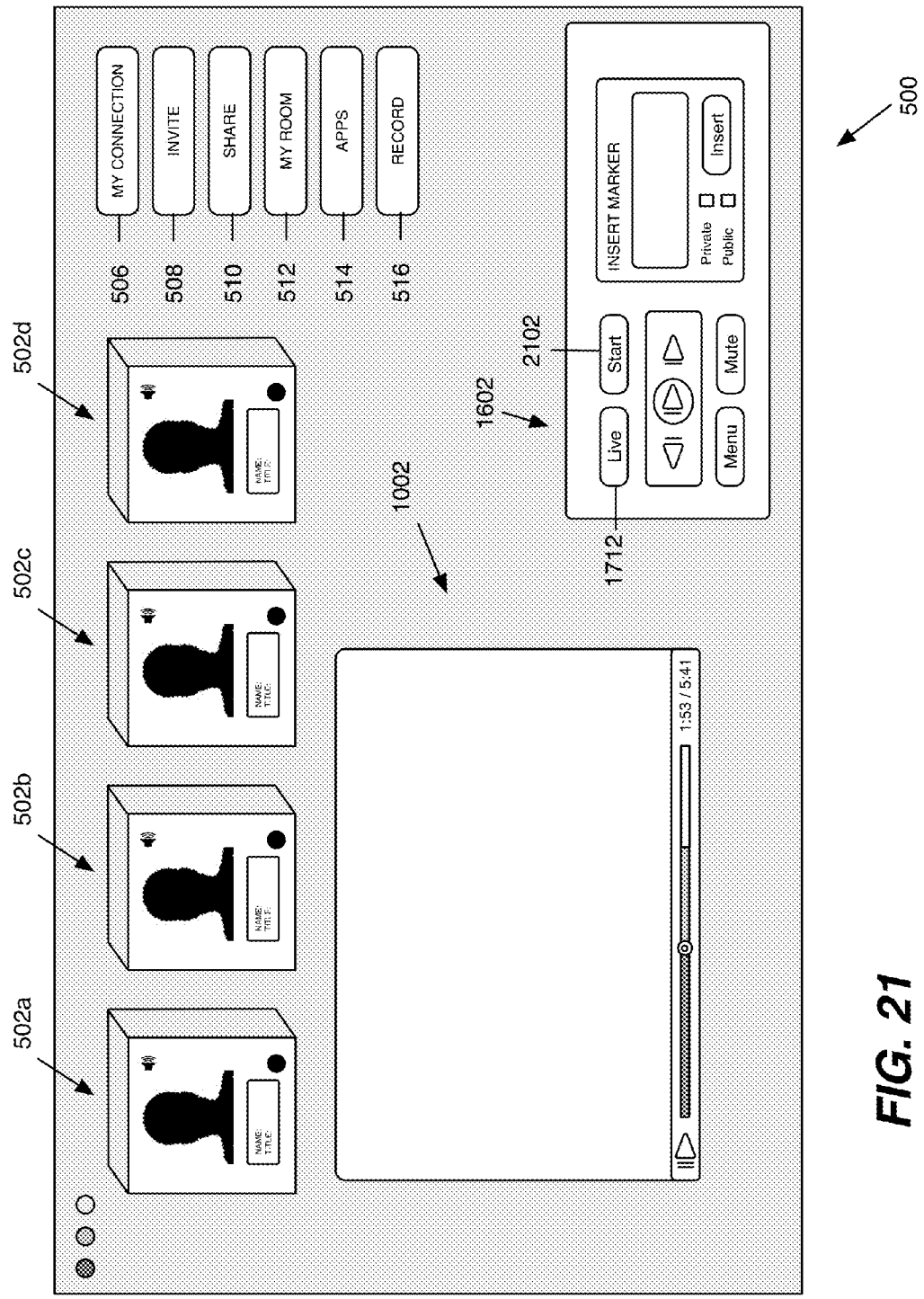
FIG. 21 illustrates the conference interface of FIG. 20 with a record/playback navigation controller after the new participant has joined the online conference.

As mentioned above and illustrated in the embodiment of FIG. 20, after receiving a request from the new participant 104 to join the online conference already in progress, the conferencing system 106 may prompt the new participant 104 to make a selection for how to join the online conference. A welcome window 2002 may be displayed in the conference interface 500 presented to the new participant 104. The welcome window 2002 may prompt the new participant 104 to select whether to join the conference live (join live component 2006) or join the conference from an earlier location, such as, a custom or recording start location (join from beginning component 2004). Regardless of which join method is selected, the new participant 104 may navigate the recorded conference 300 via the record/playback navigation controller 1602 (FIG. 21). As illustrated in FIG. 21, the new participant 104 may conveniently "go live" by selecting the live input 1712. The record/playback navigation controller 1602 may further comprise a "go to start" input 2102 for enabling the new participant to quickly navigate to the recording start location at anytime.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the multi-platform virtual conference location system. Furthermore, the logical functions may be embodied in any computer readable medium for use by or in connection with an instruction execution system, apparatus, or device, such as a computer-based system, processor-containing system, or other system associated with the multi-platform virtual conference location system that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for joining an online conference already in progress, the method comprising:
    a conferencing system establishing an audio conference between a plurality of participants accessing the conferencing system via a communication network;
    the conferencing system presenting to the participants via a graphical user interface the audio conference and a conference interface displaying a participant object identifying each of the participants;
    synchronously recording the audio conference with content presented in the conference interface;
    storing the synchronized audio conference and the content;
    during the audio conference, receiving from a new participant a request to join the audio conference already in progress;
    in response to the request to join the audio conference, prompting the new participant whether to join in a live mode or a recorded mode before adding the new participant to the audio conference;
    if the recorded mode is selected by the new participant:
    playing back the synchronized audio conference and the content presented in the conference interface to the new participant beginning from a recording start location; and
    presenting the conference interface to the plurality of participants without adding a further participant object identifying the new participant; and
    if the live mode is selected by the new participant: adding the new participant to the audio conference; and
    adding a new participant object to the conference interface identifying the new participant; and the method further comprising:
    while in the recorded mode, receiving a "go live" input from the new participant; and
    in response to the "go live" input, adding the new participant to the audio conference and adding the further participant object identifying the new participant to the conference interface.

2. The method of claim 1, wherein the participant objects displayed in the conference interface comprise a first display for presenting a graphical representation of the corresponding participant and a having a user interface control that, when selected by any of the participants, changes the selected participant object from the first display to a second display for presenting corresponding participant profile information.

3. The method of claim 2, wherein the participant objects comprise an interactive cube having multiple display faces.

4. The method of claim 1, wherein the synchronously recording the audio conference with the content presented in the conference interface comprises:
    capturing the content presented in the conference interface as a video stream; and
    synchronizing the video stream with a plurality of audio streams comprising the audio conference.

5. The method of claim 1, wherein the content presented in the conference interface comprises one of an inserted audio stream, an inserted video stream, an inserted document, and a collaboration application.

6. The method of claim 1, wherein the synchronously recording the audio conference with the content presented in the conference interface comprises: selecting a channel to record in the conference interface.

7. The method of claim 1, wherein the synchronously recording the audio conference with the content presented in the conference interface comprises: selectively recording the content in the conference interface according to a user selection of one or more conference channels.

8. The method of claim 7, wherein the one or more conference channels comprise one or more of a participant audio stream and a participant inserted media stream.

9. The method of claim 1, wherein the synchronously recording the audio conference with the content presented in the conference interface comprises:
    prompting one of the participants to select one or more components to record;
    receiving the user selection; and
    synchronously recording the audio conference with the selected components.

10. The method of claim 1, wherein the synchronously recording the audio conference with the content presented in the conference interface comprises generating a timestamp for a plurality of conference events occurring during the audio conference.

11. The method of claim 1, wherein the playing back the synchronized audio conference and the content presented in the conference interface to the new participant beginning from the recording start location further comprises presenting a navigation controller in the conference interface for enabling the new participant to navigate the synchronized audio conference and the content.

12. The method of claim 11, further comprising:
    receiving a navigation input from the new participant via the navigation controller;
    in response to the navigation input, determining a location in the synchronized audio conference and the content; and
    playing back to the new participant the synchronized audio conference and the content at the location.

13. The method of claim 12, wherein the navigation input comprises one of a pause/play input, a rewind input, a forward input, a go live input, and one of the conference events.

14. The method of claim 1, wherein the playing back the synchronized audio conference and the content to the new participant further comprises:
    presenting a navigation controller via the conference interface;
    receiving a navigation input associated with the navigation controller; and
    playing back the synchronized audio conference and content according to the navigation input.

* * * * *